J. L. KEASOR.

Wheel-Plow.

No. 69,678.

Patented Oct. 8. 1867.

Witnesses:

Inventor:

United States Patent Office.

JOHN L. KEASOR, OF LACONIA, NEW HAMPSHIRE.

Letters Patent No. 69,678, dated October 8, 1867.

---

IMPROVEMENT IN SELF-ACTING PLOUGH-HOLDER.

---

*The Schedule referred to in these Letters Patent and making part of the same.*

---

TO ALL WHOM IT MAY CONCERN:

Be it known that I, JOHN L. KEASOR, of Laconia, in the county of Belknap, and State of New Hampshire, have invented a new and improved Self-Acting Plough-Holder; and I do hereby declare that the following is a full, clear, and exact description thereof, which will enable others skilled in the art to make and use the same, reference being had to the accompanying drawings, forming a part of this specification, in which—

Similar letters of reference indicate corresponding parts.

My invention has for its object to furnish an improved means by which a plough or ploughs may be connected to a wagon so as to be held and operated automatically; and it consists in the combination of a plough or ploughs with a wagon, and in the combination and arrangement of the parts by which the plough is connected to the wagon with the said plough and wagon.

Figure 1:
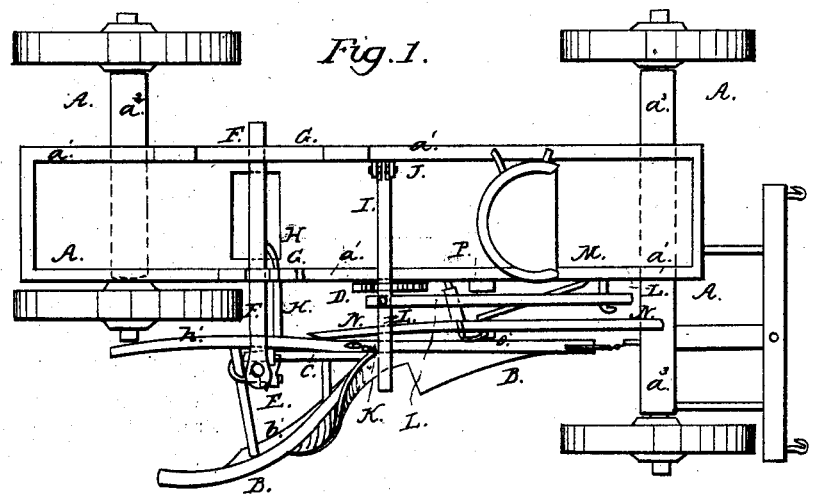
Figure 1 is a top view of my improved machine.
Figure 2:
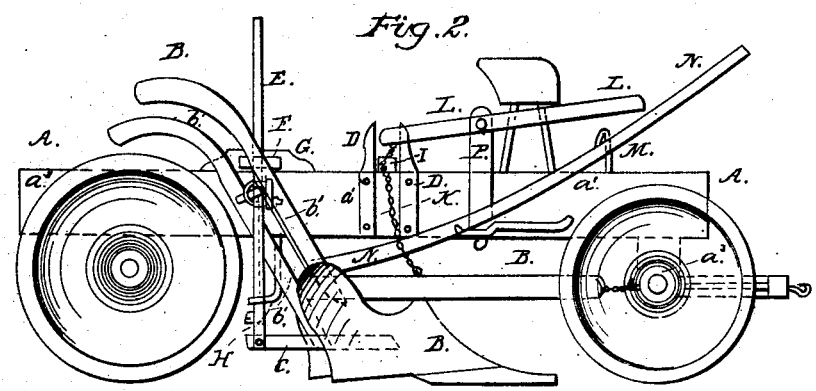
Figure 2 is a side view of the same.

A represents a wagon, the box $a^1$ of which is made narrow, and the axles of which are made of different lengths, and are so arranged that the inner or land-side wheels may run in line with each other. The rear axle $a^2$ is made short, so that the outer rear wheel may run close to the wagon-box, and upon the unploughed land. The forward axle $a^3$ is made long, so that the outer fore wheel may run upon the ploughed land, or in the previous furrow. B is an ordinary plough, the forward end of the beam of which is connected to the elongated part of the fore axle $a^3$ by a clevis and short chain, or in any other convenient manner. C is a horizontal bar, which is secured to the lower round of the plough-handles $b^1$, and the forward end of which extends forward into the nose of the plough, as shown in dotted lines in fig. 2. To the rear end of the horizontal bar C is attached the lower end of the vertical bar E, which is yoked to the upper round of the plough-handles $b^1$, and which passes up through the outer end of the beam F. The beam F rests upon the upper edges of the sides of the wagon-box $a^1$, and is kept in place by keepers G, attached to the said edges of the said box, the farther keeper being made longer to allow the free end of the beam F to have more play. H is a brace-rod, one end of which is attached to the beam F within the wagon-box; it then passes down through a hole in the bottom of the said box, and is bent outward, and has an eye formed upon its outer end, through which the vertical bar E passes. By this construction the plough is connected loosely to the wagon, and yet in such a way that it will be held steadily in proper position while working. I is a beam, the inner end of which is pivoted to a support, J, attached to the side board of the box $a^1$ farthest from the plough. The bar I rests between two vertical guide-bars, attached to the side board of the box $a'$, nearest to the plough, so that its outer end may move freely up and down. K is a chain, the upper end of which is attached to the outer end of the bar I, and its lower end to the beam of the plough, so that, by raising the outer end of the bar I, the plough may be raised from the ground, and may be held suspended. For this purpose the end of the lever L is connected to the outer end of the bar I, the said lever being pivoted to the side of the box $a^1$, or to some suitable support P, attached to said box, and its forward end extending forward into such a position that it may be reached and operated by the driver from his seat. M is a hook attached to the forward part of the box $a^1$, in such a position that the free or forward end of the lever L may be hooked upon it, when it is desired to hold the plough suspended. N is a lever, the lower end of which is so formed as to serve as a plough-cleaner, and which is pivoted to a suitable support, O, attached to the side of the box $a$, in such a position that its upper end may be reached and operated by the driver to clean the plough, the support O being so formed that it will support the cleaner N when not in use, in such a position as to be out of the way. The horses are attached to the outer or elongated part of the forward axle $a^3$ in such a way that the draught may be applied directly in front of the plough, as shown in fig. 1. In this way one or more ploughs or a gang of ploughs may be attached to the wagon, or the plough may be attached in the same way to an ordinary wagon, provided the reach be long enough to allow the plough to be attached between the forward and rear wheels.

I claim as new, and desire to secure by Letters Patent—

1. Attaching one or more ploughs to the side of a wagon substantially as herein shown and described.

2. The combination of the horizontal bar C, vertical bar E, horizontal beam F, and brace bar H with each other and with the plough B and wagon A, substantially as herein shown and described, and for the purpose set forth.

3. The combination of the pivoted bar I, chain K, or its equivalent, and lever L, with each other and with the plough B and wagon A, substantially as herein shown and described, and for the purpose set forth.

4. The combination of the lever plough-cleaner N with the plough B and wagon A, substantially as herein shown and described, and for the purpose set forth.

JOHN L. KEASOR.

Witnesses:
SYLVESTER S. WIGGIN,
JACOB P. BOODEY.